(No Model.) 3 Sheets—Sheet 1.
B. YOCH.
MINING MACHINE.
No. 302,310. Patented July 22, 1884.
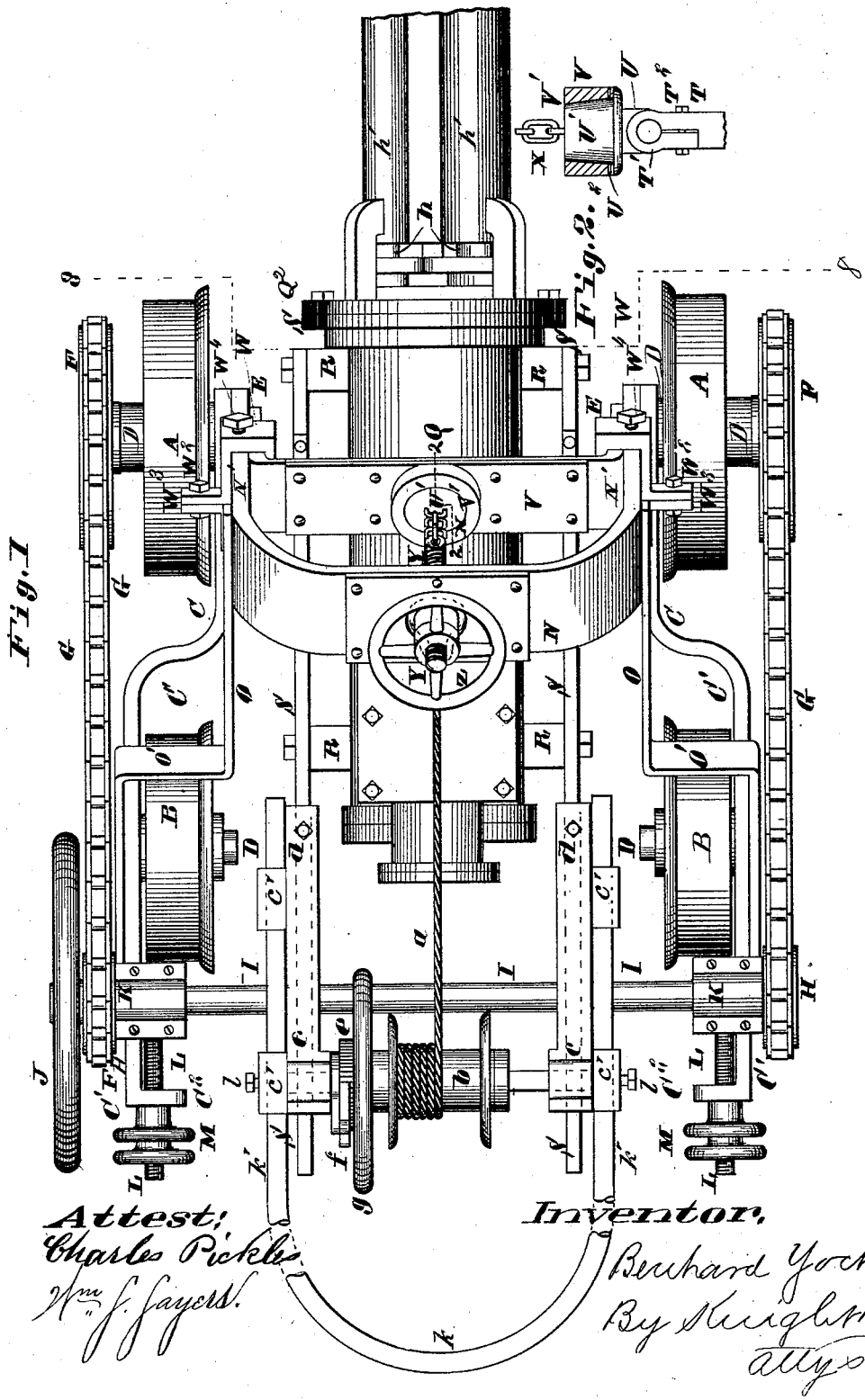

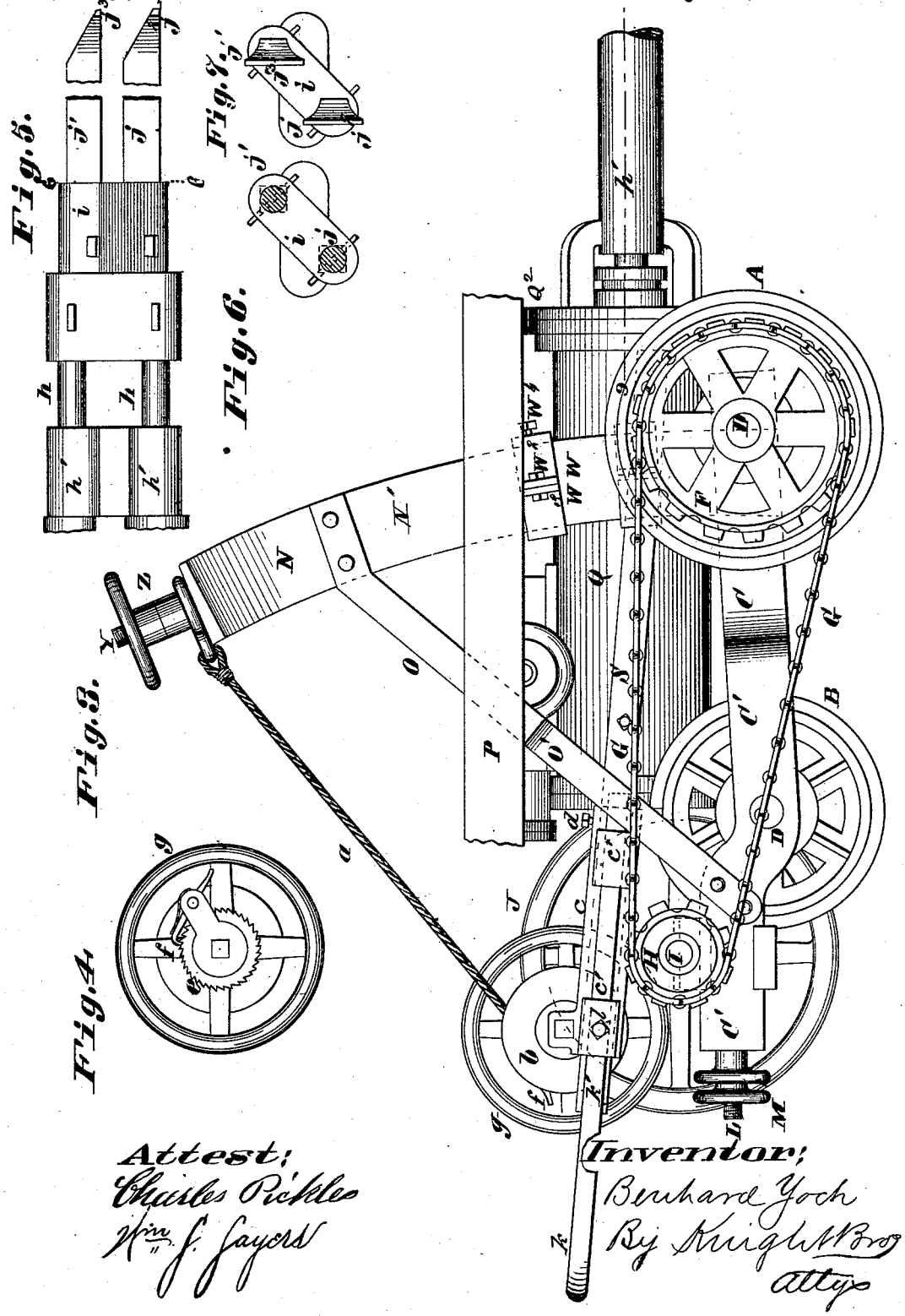

(No Model.)
3 Sheets—Sheet 3.
B. YOCH.
MINING MACHINE.
No. 302,310. Patented July 22, 1884.
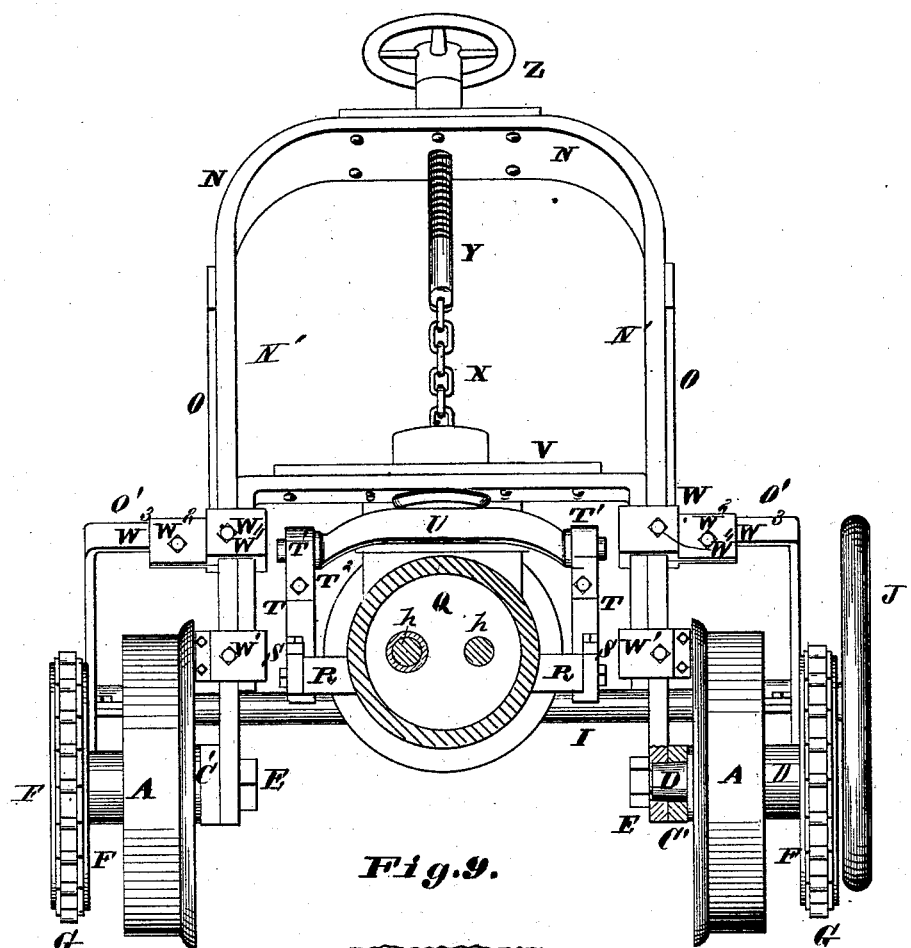
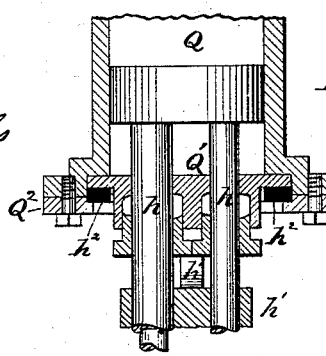

UNITED STATES PATENT OFFICE.

BENHARD YOCH, OF ST. LOUIS, MISSOURI.

MINING-MACHINE.

SPECIFICATION forming part of Letters Patent No. 302,310, dated July 22, 1884.

Application filed November 27, 1882. (No model.)

*To all whom it may concern:*

Be it known that I, BENHARD YOCH, of the city of St. Louis, in the State of Missouri, have invented a certain new and useful Improvement in Mining-Machines, of which the following is a full, clear, and exact description, reference being had to the accompanying drawings, forming part of this specification.

This improvement relates to the class of mining-engines driven by air or steam in which the pick-cylinder is supported on a truck upon which it has universal motion and vertical adjustment.

The scope of my invention is set forth in claims.

Figure 1 is a top view of a sufficient part of a mining-machine to show my improvement, except as to the picks. Fig. 2 is a detail section at 2 2, Fig. 1. Fig. 3 is a side view of the part of the machine shown in Fig. 1. Fig. 4 is a side view of the hand-wheel that is used for turning the drum upon which is coiled the guy-rope by which the cylinder is held at the desired inclination. Fig. 5 is a top view of the picks, holder, and guide-frame. Fig. 6 is a transverse section at 6 6, Fig. 5. Fig. 7 is an end view of the picks, holder, and guide-frame. Fig. 8 is a front view of the machine, parts being shown in section at 8 8, Fig. 1. Fig. 9 is a horizontal section at 9 9, Fig. 3.

A A and B B are ground-wheels, upon which the truck frame or body C is supported. The wheels turn on spindles D, secured to the side bars of the frame in any suitable manner. I have shown the spindles fitting in sockets in the side bars and held by nuts E. I bend the side bars, C', as shown, so that the rear part of the truck-body shall be wider than the front part, the front wheels, A, being on the outer side of the side bars and the rear wheels, B, being at the inner side of said bars. (See Figs. 1 and 3.)

Upon the sides of the wheels A are sprocket-wheels F, carrying gear-chains G. These chains extend from the wheels F around sprocket-wheels H upon a shaft, I, which is turned by means of a hand-wheel, J. It will be seen that the turning of the shaft I will turn the wheels A upon their axles and thus move the machine forward or backward. The retrograde rotation of the shaft I may be prevented by a ratchet-wheel upon the shaft and a pawl, (a very common device for such purposes.) The shaft I turns in movable boxes K, said boxes being constructed to slide on the side bars, C'. The purpose of this arrangement is to enable the stretching of the drive-chains G. The boxes are drawn backward (to stretch the chains) by screw-studs L, extending from the boxes through lugs $C^2$, upon the ends of the side bars. The studs are fitted with jam-nuts M, bearing against the rear sides of the lugs $C^2$.

N is a standing arch secured at the lower ends to the side bars, C', and connected to the side bars also by braces O, extending from the upper parts of the arch to the rear parts of the side bars. These braces have shoulders O', that form brackets upon each side, serving as supports for the rear part of the rail, platform, or frame when the same is loaded upon the truck. This is done when moving the machine a distance in the mine, it being understood that when the machine is in operation it stands on the said movable track. The position of the track-frame upon the brackets is indicated by the bar P, representing a part of one of the side bars or rails of the frame.

No novelty is claimed in the cylinder Q, (in this application.) It has transversely-projecting bracket-arms R, secured to the side rails, S. The side rails are secured by hangers T to the ends of the bail U, the hangers being connected to the bail by strap-joints T', capable of being contracted upon the wrist-pins of the bail by bolts $T^2$. (See Fig. 2.) The bail has a frusto-conical plug, U', projecting upward from its center and working in a socket, V', of the bridge-bar V, said bar being supported on the sides of the arch N by means of strap-brackets W W', constructed to be movable vertically on the side bars, N', of the arch. These brackets are contracted upon the side bars, N', by screws $W^2$ passing through lugs $W^3$. These lugs $W^3$ form the fore supports of the track-frame when it is placed upon the truck.

$W^4$ are set-screws, by which the straps W W' may be secured in position upon the arch N. The straps W' are shown similarly arranged to those W, except for the extended bearing-lugs $W^5$.

X is a suspensory chain attached to the plug U' and to a hanger screw-rod, Y, passing up through the middle of the arch N.

Z is a hand-nut screwing on the rod Y and bearing on top of the arch so as to sustain the bail U by means of the chain and rod. Thus the cylinder is sustained at any desired height and is capable of universal movement on the plug U' and the strap-joints T'.

$U^2$ are washers between the shoulder of the conical plug and the bridge-bar V. As the bearing wears a washer may be removed to allow the plug to enter farther into the socket so as to compensate for wear.

The preponderance of weight in the cylinder will be behind the point of suspension, and to support the rear end, I use a guy-rope, $a$, extending from the top of the arch N to a windlass, $b$, turning in bearings $c$ secured to the side bars, S. I show the bearing $c$ movable on the side bars and held in position thereon by a set-screw, $d$. The windlass is held in position to prevent the unwinding of the guide-rope by a ratchet-wheel, $e$, and pawl $f$. The windlass is turned by a hand-wheel, $g$.

$h\ h$ are the parallel piston-rods carrying a socket-head, $i$, in which the drills are secured. The arrangement of the drills is peculiar, the lower drill, $j$, being set in advance of the upper drill, $j'$. The purpose of this arrangement is to cause the edge $j^2$ of the lower drill to clear the way for the edge $j^3$ of the upper one. To explain, I will say that in undercutting the coal the drills are moved sidewise in a horizontal direction, the edge $j^2$ being in advance of the edge $j^3$ and the edges arranged diagonally one to each other, the lower drill clearing away a channel which aids materially in the effective work of the upper drill. The drill-points are shown arranged for cutting in a horizontal direction, from left to right. To arrange the drills for cutting from right to left, they must be arranged in a line at right angles to that shown, and the edges presented in an opposite direction. To make a vertical cutting, the head of the cylinder and frame $h'$ and piston are turned one-fourth around to place the drills or picks with cutting-edge at top. A turnable cylinder-head is shown in the Letters Patent granted to me June 7, 1881, and numbered 242,734. This, therefore, I do not here broadly claim. In the present case the guide-frame $h'$ is not made in one piece with either the head Q' or flange $Q^2$, but is secured in position by a flange, $h^2$, which is annular and of equal diameter with the head Q', as shown, and is interposed between the head and the flange $Q^2$, so as to be held in position by the latter. This construction allows the frame $h'$ to be slid outward on the piston-rods, when the flange $Q^2$ is made loose, so as to give free access to the stuffing-boxes. The head Q' and flange $h^2$ fit in a rabbet-groove in the end of the cylinder, and the head is made with a tight joint therein, (either by a ground joint or a gasket.)

It will be seen that the arch N is curved backward in its upper part, the purpose of this being to prevent its contact with the wall of coal. While the upper part of the arch bends backward the lower ends of the same are vertical, or nearly so, so that the longitudinal position of the cylinder remains substantially unchanged during the vertical adjustments of the same.

$k$ is the handle having sides $k'$ passing through the eye-lugs $c'$ upon the sides of the sleeves $c$. $l$ are set-screws by which the handle is held in position. The purpose of making the handle adjustable is to admit of its use in extended condition (so as to give a good purchase on the machine) where space allows, and allow the use of the machine in contracted spaces (by contraction of the handle.)

In my application No. 68,138, filed July 31, 1882, I have shown and described other means for supporting a platform on the machine and other means for holding the cylinder to its vertical adjustment.

In my application filed February 16, 1883, No. 85,302, I have shown my picks arranged diagonally.

The truck or carriage which supports the mining-engine herein described is not claimed herein; but I hereby reserve the right to claim the same in a subsequent application.

I claim—

1. In a mining-machine, the combination of a truck, arch secured to the front end of the truck, and having lugs on its sides to form front brackets, and inclined brace-bars extending from the rear part of the truck to near the tops of the side bars of the arch, and having shoulders to form rear brackets, the said front and rear brackets being adapted to support a platform, as set forth.

2. In a mining-machine, the combination of a truck, arch secured to the front end of the truck, straps secured to the side bars having lugs to form front brackets, and inclined brace-bars formed with shoulders to provide rear brackets and extending from the rear part of the truck to near the top of the side bars of the arch, the said front and rear brackets being adapted to support a platform, as set forth.

3. In a mining-machine, the combination, with a cylinder, of the supporting-bail having a conical plug, a guiding bridge-bar located above the supporting-bail, and having a socket to receive the plug, means connected directly to the plug to support the cylinder on the arch, and removable washers between the plug and bridge-bar, as set forth.

BENHARD YOCH.

Witnesses:
SAML. KNIGHT,
GEO. H. KNIGHT.